United States Patent
DeJong et al.

(10) Patent No.: US 8,418,943 B2
(45) Date of Patent: Apr. 16, 2013

(54) EGG SHELL MEMBRANE SEPARATION

(75) Inventors: Michael DeJong, Malcom, IA (US); Vladimir Vlad, Ames, IA (US)

(73) Assignee: Biova, L.L.C., Johnston, IA (US)

( * ) Notice: Subject to any disclaimer, the term of this patent is extended or adjusted under 35 U.S.C. 154(b) by 190 days.

(21) Appl. No.: 12/874,575

(22) Filed: Sep. 2, 2010
(Under 37 CFR 1.47)

(65) Prior Publication Data

US 2011/0303771 A1 Dec. 15, 2011

Related U.S. Application Data

(63) Continuation-in-part of application No. 12/512,453, filed on Jul. 30, 2009, now Pat. No. 7,954,733, which is a continuation of application No. 11/333,697, filed on Jan. 17, 2006, now Pat. No. 7,584, 909.

(60) Provisional application No. 60/644,643, filed on Jan. 18, 2005.

(51) Int. Cl.
*B02C 19/00* (2006.01)

(52) U.S. Cl.
USPC ....... 241/1; 99/498; 241/21; 241/29; 241/301

(58) Field of Classification Search .............. 241/1, 301, 241/21, 29; 426/614; 99/496, 498
See application file for complete search history.

(56) References Cited

U.S. PATENT DOCUMENTS

| | | | |
|---|---|---|---|
| 2,065,384 A | 12/1936 | Lomax | |
| 2,217,815 A | 10/1940 | Rector et al. | |
| 2,823,215 A | 2/1958 | Downing | |
| 3,194,732 A | 7/1965 | Neuhauser | |
| 3,196,075 A | 7/1965 | Neuhauser | |
| 4,052,009 A | 10/1977 | Penque | |
| 4,082,856 A | 4/1978 | Zwiep et al. | |
| 4,789,667 A | 12/1988 | Makino et al. | |

(Continued)

FOREIGN PATENT DOCUMENTS

| ES | 2 181 580 B1 | 5/2004 |
|---|---|---|
| JP | 405097897 A | 4/1993 |

(Continued)

OTHER PUBLICATIONS

PCT/US2006/001908 Glycon Technologies, LLC Search Report, Jul. 11, 2006.

(Continued)

*Primary Examiner* — Mark Rosenbaum
(74) *Attorney, Agent, or Firm* — McKee, Voorhees & Sease, P.L.C.

(57) ABSTRACT

A method for processing unseparated egg shells includes placing unseparated egg shells in a separation tank containing fluid, applying cavitation to the unseparated egg shells in the fluid to thereby separate the egg shell membranes from the egg shells, and recovering the egg shell membranes. An apparatus for processing unseparated egg shells includes a separation tank for holding a fluid, a recirculating loop operatively connected to the separation tank, and at least one submersible mixer in the recirculating loop to recirculate the fluid and egg shell membranes and egg shells within the fluid. The apparatus further includes a membrane collection conveyor for conveying egg shell membranes from the separation tank and a shell conveyor positioned beneath the separation tank for conveying egg shells away from the separation tank.

31 Claims, 6 Drawing Sheets

U.S. PATENT DOCUMENTS

| | | | |
|---|---|---|---|
| 5,053,238 | A | 10/1991 | Zeidler et al. |
| 5,064,941 | A | 11/1991 | Davison |
| 5,415,875 | A | 5/1995 | Kakoki et al. |
| 5,935,142 | A | 8/1999 | Hood |
| 6,176,376 | B1 | 1/2001 | MacNeil |
| 6,521,129 | B1 | 2/2003 | Stamper et al. |
| 6,534,897 | B2 | 3/2003 | Takeuchi et al. |
| 6,649,203 | B1 | 11/2003 | Thoroski |
| 6,790,454 | B1 | 9/2004 | Abdul Malak et al. |
| 6,821,353 | B1 | 11/2004 | Kuhl |
| 6,899,294 | B2 | 5/2005 | MacNeil |
| 7,007,806 | B2 | 3/2006 | MacNeil |
| 7,584,909 | B2 * | 9/2009 | Vlad .................................. 241/2 |
| 2002/0036244 | A1 | 3/2002 | Kaully et al. |
| 2003/0209617 | A1 | 11/2003 | MacNeil |
| 2004/0166213 | A1 | 8/2004 | Thoroski |
| 2004/0180851 | A1 | 9/2004 | Long et al. |
| 2007/0197415 | A1 | 8/2007 | Ronning et al. |
| 2008/0206410 | A1 | 8/2008 | Efstathiou et al. |
| 2009/0053803 | A1 | 2/2009 | Cantineau |

FOREIGN PATENT DOCUMENTS

| | | |
|---|---|---|
| JP | 08173838 A | 7/1996 |
| WO | WO 98 41326 A1 | 9/1998 |
| WO | WO 2004/071324 A2 | 8/2004 |

OTHER PUBLICATIONS

Database WPI, Section Ch, Week 200433, Derwent Publications Ltd., London, GB; XP002384231 ES 2 181 580 B1 (BDN ING Alimentacion SL) Abstract May 16, 2004.

Biova, L.L.C., PCT/US2011/50340, International Search Report and Written Opinion dated Feb. 9, 2012, 9 pages.

* cited by examiner

EGG SHELL MEMBRANE SEPARATION

RELATED APPLICATIONS

This application is a continuation-in-part of U.S. patent application Ser. No. 12/512,453, filed Jul. 30, 2009, now U.S. Pat. No. 7,954,733, which is a Continuation of U.S. patent application Ser. No. 11/333,697 filed Jan. 17, 2006, now U.S. Pat. No. 7,584,909, which claims priority to U.S. Provisional Patent Application No. 60/644,643, filed Jan. 18, 2005, both of which are incorporated by reference.

BACKGROUND OF THE INVENTION

The present invention relates to methods, apparatus, and a system for egg shell membrane separation and a purified form of egg shell membranes produced by the separation method. The present invention addresses a number of different problems, some of which may seem unrelated without having the benefit of this disclosure. The problems include, but are not limited to, the costs associated with landfill disposal of egg shell membranes, the need for elemental calcium for various uses, and the need for the constituent components found in egg shell membranes. Some of these problems are discussed in U.S. Pub No. 2003/0209617A1 to MacNeil, U.S. Pat. No. 6,649,203B1 to Thoroski, U.S. Pub No. 2004/0166213A1 to Thoroski, and U.S. Pat. No. 6,790,454B1 to Abdul Malak et al, all of which are incorporated by reference herein, each in its entirety.

In the U.S., there has been increased consumption of eggs during the 1990s. In 1997, over 5,000 tons of egg shell membranes have been available on the U.S. market. A related problem to the processing necessary to support this magnitude of egg processing is the cost for landfill disposal of egg shell membranes. This waste material created additional problems as it is further observed that this type of hatchery waste material is considered to be odiferous.

Egg shell powder is used in the food industry, including animal and human nutritional supplements. Egg shells provide approximately 36-37 percent elemental calcium in addition to traces of phosphorous and other trace elements. In addition to potential uses of the egg shell, the egg shell membrane is known for being rich in a number of different materials, including, without limitation collagen, hyaluronic acid, lysine, histidine, arginine, threonine, glutamic acid, proline, glysine, cysteine, valine, methionine, isoleucine, leucine, tyrosine, phenylalanine and tryptophan. Some of these materials are well known as high value materials, yet due to various problems, these materials go to waste. Despite the general recognition of the tremendous potential value of egg shell membranes when its constituents are extracted, little has been done to realize this value. Thus hatchery waste continues to include unseparated egg shells which is still being sent to land fills. There are numerous problems that prevent the use of egg shell membranes. Including problems which prevent hatcheries or egg breaking facilities from separating egg shell membranes in a useable form. There are specific problems in the context commercial context which provide additional challenges not present in a laboratory environment.

One problem relates to the need for a production process for egg shell membrane separation which is continuous. In the hatchery environment or egg breaking facility environment, waste is being continuously produced, and therefore it would be highly desirable for egg shell membranes to be separated from egg shells continuously as well. To not do so, would create significant problems in that either the hatchery or egg breaking operations would be slowed, not all waste would be processed, waste would need to be processed when other hatchery operations were offline, or similar problems which would be unacceptable in the such environments.

Therefore it is a primary object, feature, or advantage of the present invention to improve upon the state of the art.

It is a further object, feature, or advantage of the present invention to reduce waste used in egg processing.

Another object, feature, or advantage of the present invention is to produce egg shell powder from what would otherwise be egg processing waste material.

Yet another object, feature, or advantage of the present invention is to produce high value products such as collagen, hyaluronic acid, or other types of polypeptides from what would otherwise be egg processing waste material.

A still further object of the present invention is to produce new revenue streams for hatcheries and egg producers.

Yet a further object, feature, or advantage of the present invention is to provide a method for separating egg shell membranes from egg shells.

A still further object, feature, or advantage of the present invention is to provide a method that reduces pathogens and contaminants in egg shell membranes.

A further object, feature, or advantage of the present invention is to provide for continuous processing of egg shells.

Another object, feature, or advantage of the present invention is to provide for automated processing of egg shells.

Yet another object, feature, or advantage of the present invention is to provide for methods, apparatus, and systems for processing egg shells that are scaleable.

A further object, feature, or advantage of the present invention is to provide for methods, apparatus, and systems for processing egg shells that are cost effective.

A still further object, feature, or advantage of the present invention is to provide for methods, apparatus, and systems for processing egg shells that does not damage collagen, hyaluronic acid or other materials to be extracted from egg shell membranes.

A still further object, feature, or advantage of the present invention is to provide for a method of processing egg shells which allows extraction processes to be performed on egg shell membranes at locations remote from egg hatcheries or egg breaking facilities.

One or more of these and/or other objects, features, and advantages of the present invention will become apparent from the specification and claims that follow.

BRIEF SUMMARY OF THE INVENTION

According to one aspect of the present invention, a method for processing unseparated egg shells is provided. The method includes placing unseparated egg shells in a separation tank containing fluid, applying cavitation to the unseparated egg shells in the fluid to thereby separate the egg shell membranes from the egg shells, and recovering the egg shell membranes.

According to another aspect of the present invention, an apparatus for processing unseparated egg shells is provided. The apparatus includes a separation tank for holding a fluid, a recirculating loop operatively connected to the separation tank, and at least one submersible mixer in the recirculating loop to recirculate the fluid and egg shell membranes and egg shells within the fluid. The apparatus further includes a membrane collection conveyor for conveying egg shell membranes from the separation tank and a shell conveyor positioned beneath the separation tank for conveying egg shells away from the separation tank.

DETAILED DESCRIPTION OF THE PREFERRED EMBODIMENT

The present invention provides for separation of egg shell membranes from egg shells in a manner which provides for significant advantages and benefits. In particular, but without limitation, the present invention provides for separation of egg shell membranes from egg shells in a manner which allows for continuous processing such that the separation can occur at a hatchery or egg-breaking facility, in a manner which prevents damage to constituent components within the egg shell membranes (such as, but not limited to collagen or hyaluronic acid or other constituent components of egg shell membranes).

Figure 1:
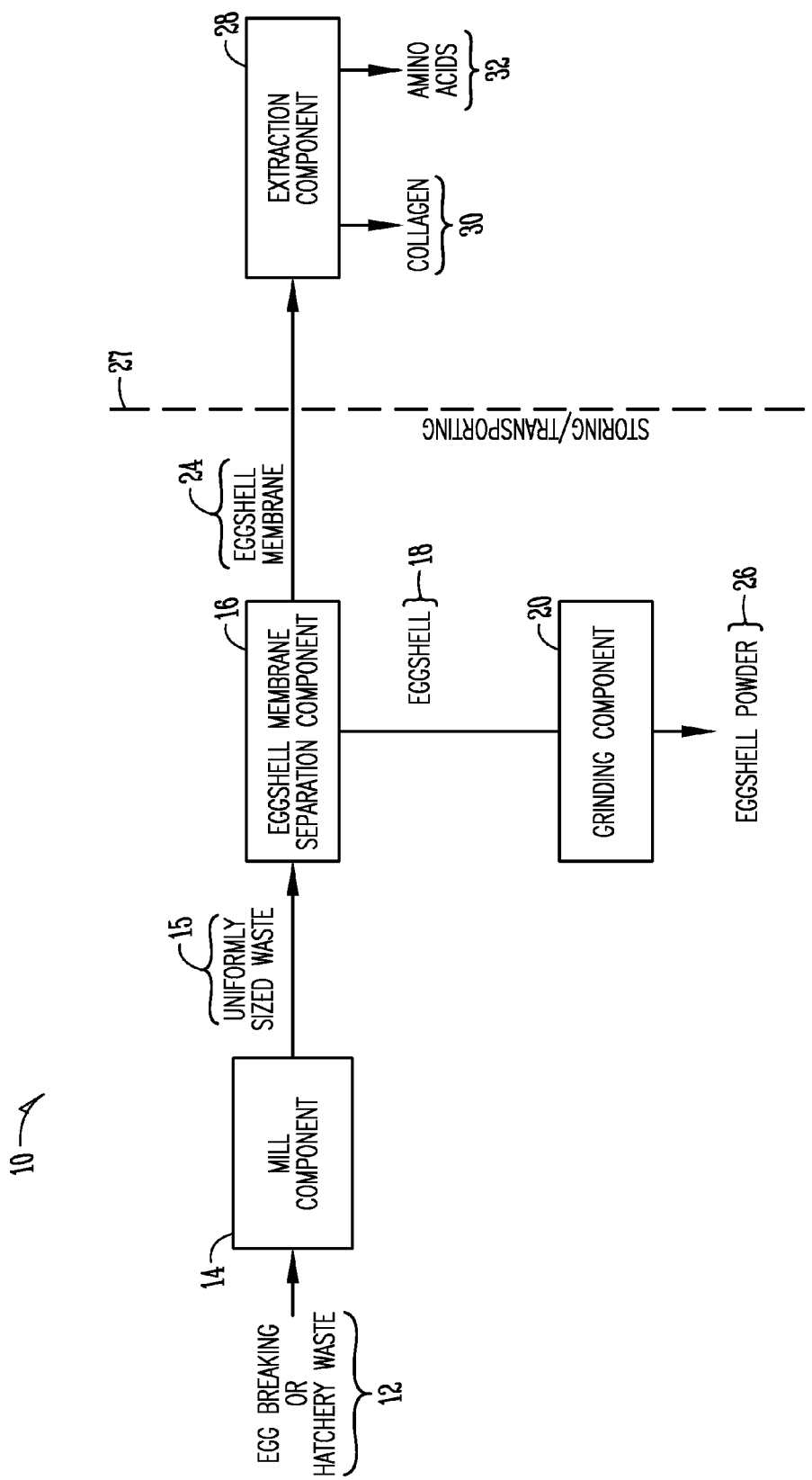
FIG. 1 is a block diagram which provides an overview of one embodiment of the system of the present invention.

FIG. 1 is a block diagram which provides an overview of one embodiment of the system 10 of the present invention. As shown in FIG. 1, waste 12 such as from a hatchery or egg-breaking facility is received. The waste 12 consists of unseparated egg shells and egg shell membranes that remain after the cracking process. Although the term "unseparated" is used, it is to be understood that there may be some degree of separation at this point. This waste 12 is received at a mill component 14. The mill component 14, if used, may provide for greater uniformity in particle size. The mill component 14 may produce uniformly sized waste particles 15. The uniformly sized waste particles 15 of unseparated egg shells and egg shell membranes are received at an egg shell membrane separation component 16. The present invention contemplates numerous embodiments for the egg shell membrane separation component 16, and preferred embodiments will be described in greater detail later herein. It is preferred that the egg shell membrane separation component 16 provide for continuous processing of hatchery or egg breaking facility waste 12. The egg shell membrane separation component 16 outputs egg shell membranes 24 and egg shells 18 each type of resulting product may then be separately processed. The egg shells 18 may be conveyed to a grinding component 20 in order to produce egg shell powder 26. The egg shell powder 26 can be used in numerous ways, including in animal nutrition, in human nutritional supplements, or for use in other applications. The grinding component 20 may be configured to grind the egg shell powder 22 into particulate sizes consistent with the use of the egg shell powder 26.

The egg shell membranes 24 may then be processed for any number of uses. The present invention contemplates that the egg shell membranes 24 may be processed onsite, or may be stored or transported 27 to another site. One type of processing that may be performed uses an extraction component 28. The extraction component 28 provides for extracting, isolating, or recovering one or more materials from the egg shell membranes. Although various types of polypeptides may be extracted, of particular interest is collagen 30, and various amino acids 32, including hyaluronic acid (HA) 30. Such materials are high value materials which are difficult and/or expensive to obtain from other sources. Other types of processing that may be performed can include solubilizing the egg shell membrane 24, fermenting the egg shell membrane 24, or otherwise processing the egg shell membrane 24.

Figure 2:
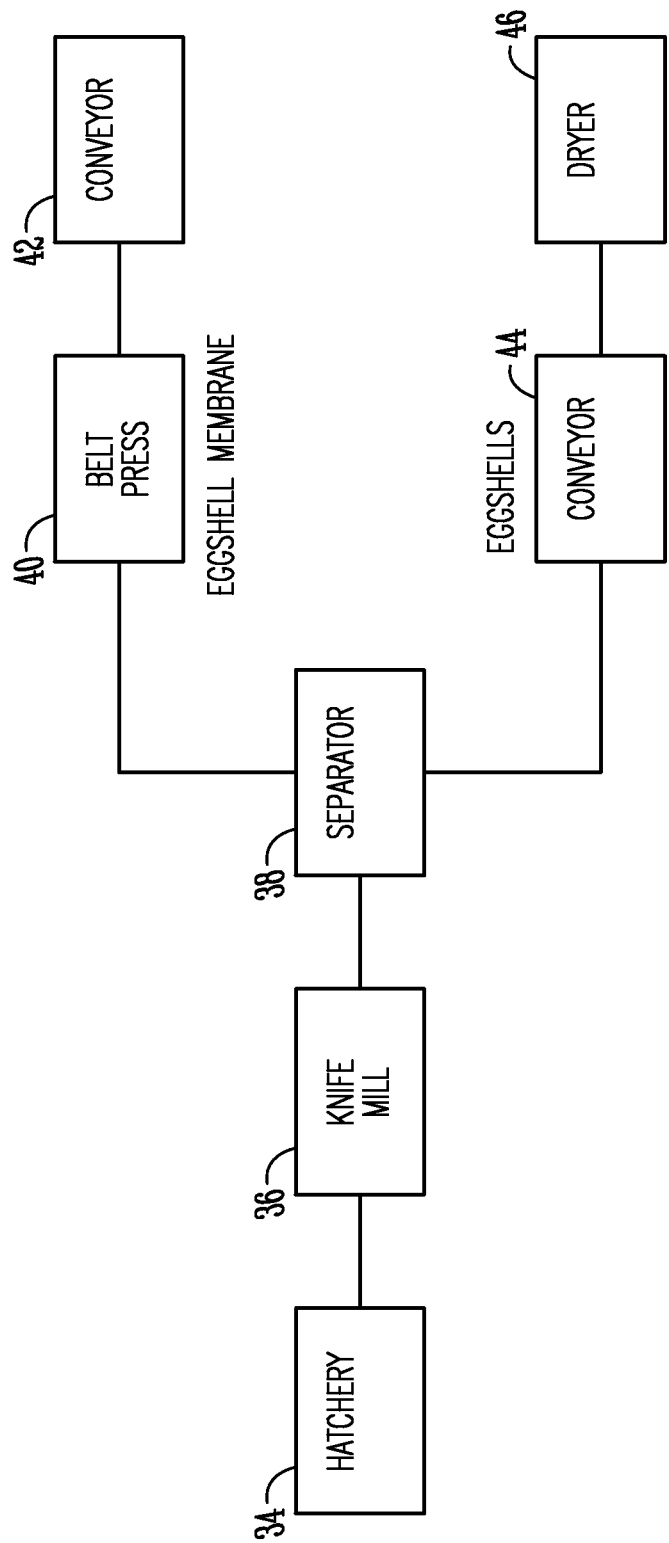
FIG. 2 is a block diagram showing perspective view illustrating one embodiment of the present invention.

FIG. 2 is a block diagram which provides an overview of an embodiment of the present invention. In FIG. 2, a hatchery or egg breaking facility 34 is shown which produces unseparated egg shells. These unseparated egg shells may be conveyed to a knife mill 36. One way of conveying unseparated egg shells to the knife mill 36 is by an auger where the apparatus of the present invention is located onsite. The knife mill 36 may be used to reduce the size of the unseparated egg shells. The reduced size unseparated egg shells then enter the separator 38. the separator 38 separates into egg shells and egg shell membranes. The egg shell membranes may then go through a belt press 40 to remove moisture from the membranes, and may then be conveyed by conveyor 42 into collection containers or to further processing. The egg shells may be conveyed by a conveyor 44 from the separator 38, to a dryer 46 or further processing.

Figure 3:
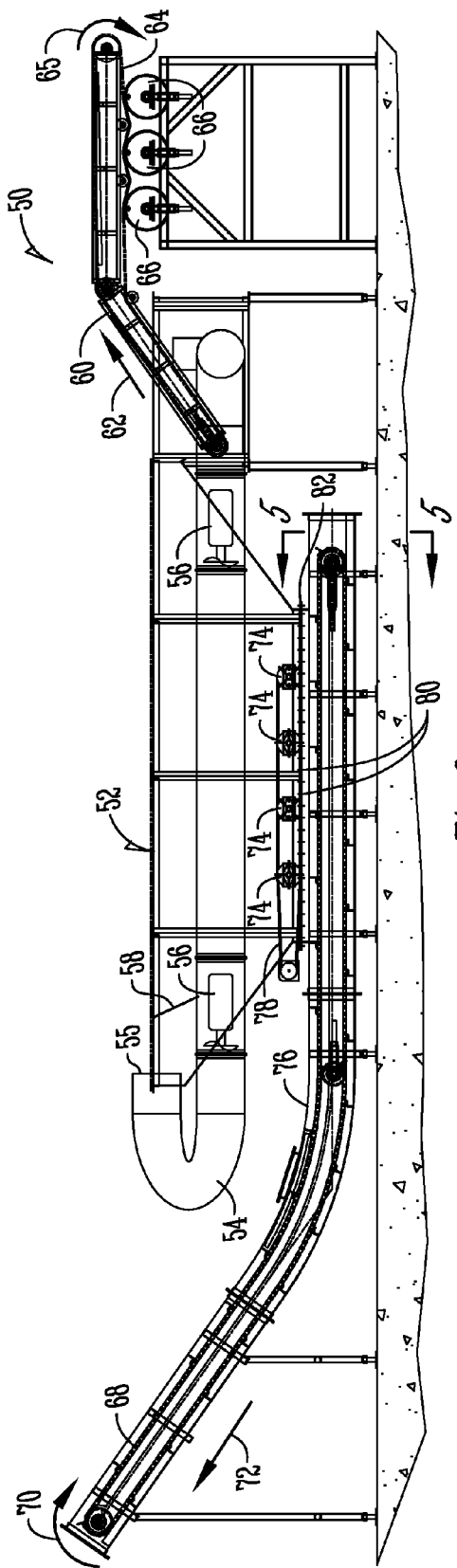
FIG. 3 is view of an apparatus for separation of egg shells from egg shell membranes using cavitation.

FIG. 3 is a view of one embodiment of a system 50 of the present invention. The system 50 includes a separation tank 52. Separation of egg shells and egg shell membranes occurs in the separation tank 52 through the application of cavitation. A recirculating loop 54 is also shown with submersible mixers 56 positioned within the recirculating loop 54. Unseparated egg shell and egg shell membranes are placed within the separation tank 52. A fluid mixture is also present in the tank. The fluid mixture may consist of water although other types of fluid may be used. The submersible mixers 56 positioned within the recirculating loop 54 create cavitation in the fluid which causes the egg shell membranes to separate from the egg shells. Once the separation occurs, then the egg shell membranes and the egg shells are separately recovered.

Figure 6:
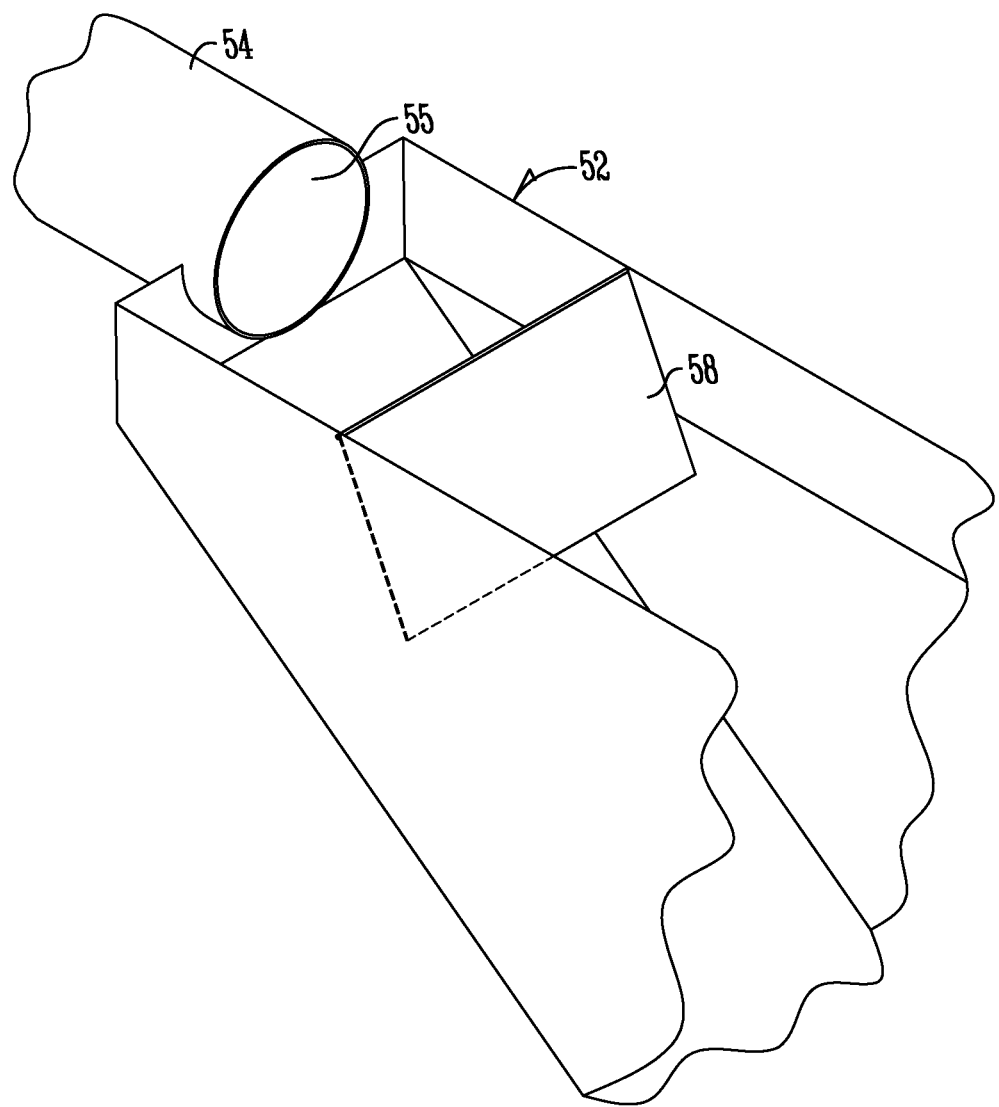
FIG. 6 is a perspective view showing the diverter shield within the separation tank.

In the embodiment shown in FIG. 3, an outlet 55 of the recirculating loop 54 is shown through which the fluid mixture which includes egg shells and egg shell membranes may enter the separation tank 52. Proximate the outlet 55 is a diverter shield 58. The diverter shield 58 diverts the fluid hitting the diverter shield 58 in a more downwardly direction towards the bottom of the separation tank 52. FIG. 6 provide a perspective view showing one example of the positioning of the diverter shield 58 within the separation tank 52 and relative to the outlet 55 of the recirculating loop 54.

Figure 5:
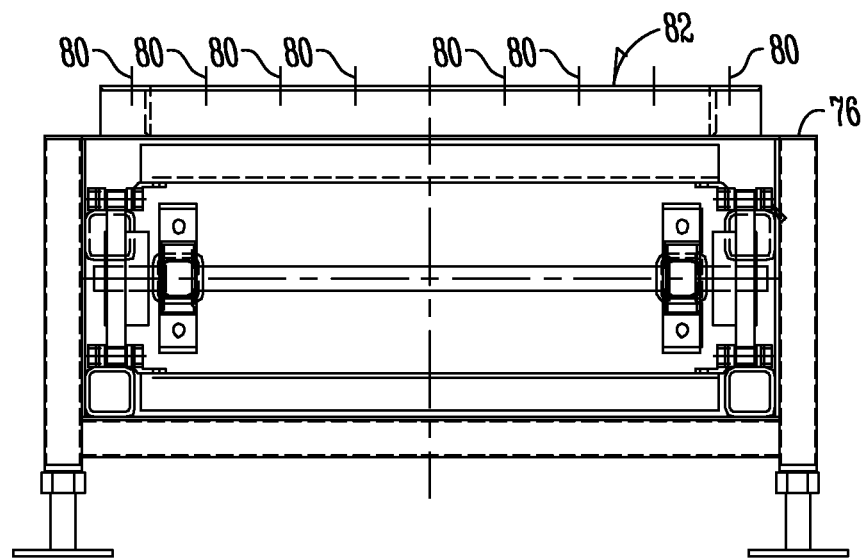
FIG. 5 is a sectional view illustrating the bottom of the separation tank and its relationship to the shell drag conveyor shown in FIGS. 3 and 4.

At the bottom of the separation tank 52 are a series of paddles 74. The paddles 74 assist in providing a washboard effect. The bottom of the tank acts as a washboard to assist in lifting the membrane. Thus, the membrane stays in suspension in moving water. This configuration assists in delaying the sinking of egg shell particles immediately to the bottom of the tank. Thus, this allows the egg shell particles to be washed several times before the egg shell particles reach the paddles on the bottom of the tank. This configuration also avoids egg shell particles trapping membrane particles at the bottom of the tank. FIG. 5 provides a sectional view showing that the egg shell particles fall through openings 80 in a sieve 82.

The egg shell membranes stay in suspension in the moving water which directs the egg shell membranes towards a membrane collection conveyor 66. An arrow 62 illustrates the direction of travel of a mesh belt 64 on the conveyor 66. An arrow 65 indicates the direction of rotation of the mesh belt 64 on the conveyor 66. The mesh belt 64 allows fluid to drain, leaving only the egg shell membranes. A plurality of rollers 66 are shown. When moist, the egg shell membranes tend to stick to the belt 64 and thus gravity is not sufficient to remove the egg shell membranes. The rollers 66 contact the membrane to release the membranes from the belt 64. Once the membranes are released from the belt 64, the membranes may be removed to a belt press. The belt press provides for further removing moisture from the egg shell membranes.

The egg shell particles settle from the bottom of the tank 52 through a sieve 82 into a tube or pipe 76 in which a drag conveyor 68 is positioned. The drag conveyor 68 moves in the direction of travel indicated by arrow 72 and with rotation indicated by arrow 70. As the egg shell particles are conveyed in an upward direction, the water is left behind. Thus, in this manner the egg shell particles are separated out of the fluid mixture.

Figure 4:
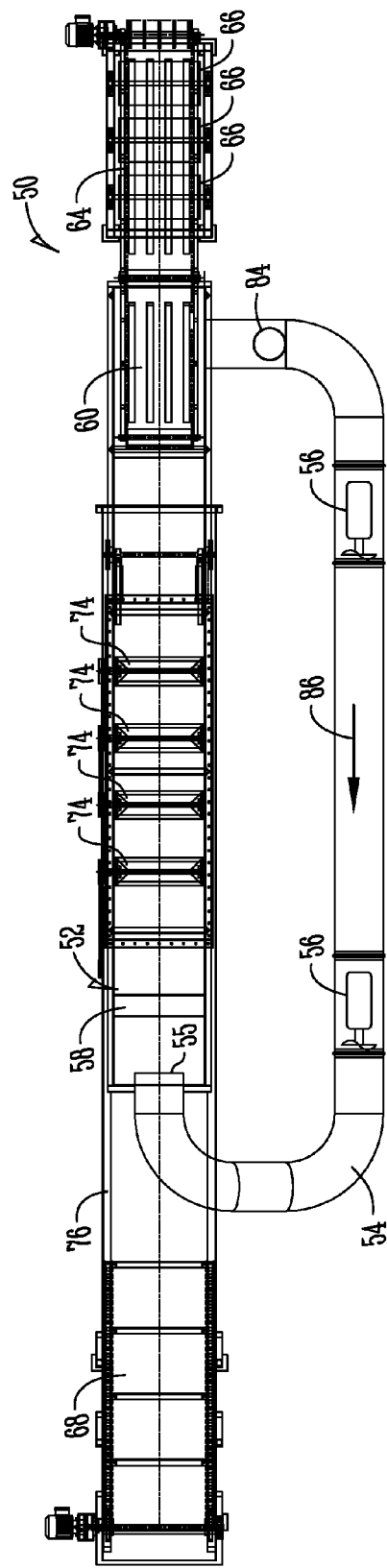
FIG. 4 is a top view of the apparatus for separation of egg shells from egg shell membranes shown in FIG. 3.

FIG. 4 is a top view of the system 50 which assists in illustrating the recirculation of the fluid. The placement of the mixers 56 in the pipe or tube 54 provide for flow of fluid in the direction indicated by arrow 86. A feed connection 84 is shown which allows for incoming unseparated egg shells to be received into the tube 54. The incoming unseparated egg shells may, for example, be fed into the system 50 by an auger coming directly from an egg breaking facility.

Figure 7:
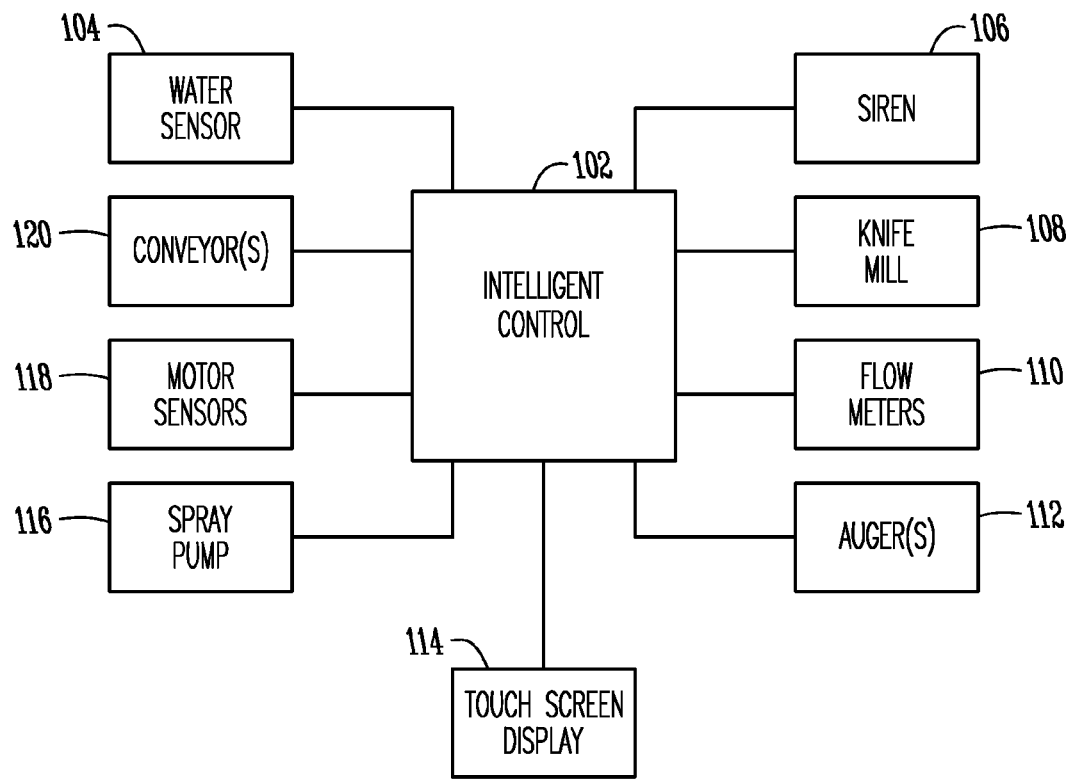
FIG. 7 is a block diagram illustrating one embodiment of a control system for controlling the processing of unseparated egg shells.

The present invention contemplates that the egg shell membrane separation process may be under electronic control. FIG. 7 is a block diagram illustrating one embodiment for electronic control. In FIG. 7, a control system 100 is shown which includes an intelligent control 102. The intelligent control 102 may be implemented using a computer, processor, microcontroller, or other type of intelligent control. Sensors may be electrically connected to the intelligent control 102. Examples of sensors may include a water sensor 104 for sensing fluid levels within the separation tank, a flow meter 110 for sensing rate of flow, and motor sensors 118 for sensing the status of different motors throughout the system. In addition, the intelligent control 102 is operatively connected to conveyors 120, augers 112, a knife mill 108, a spray pump 116 for controlling operation of these devices. A touchscreen display 114 may be operatively connected to the intelligent control system to allow an operator to control the separation system. In addition a siren 106 may be operatively connected to the intelligent control system to provide an alarm upon detection of an alarm condition within the system. Of course, other types of sensors may be used throughout the system to monitor the status of components of the system. Similarly, addition devices may be electronically controlled by the system as may be appropriate within a particular embodiment.

Although specific embodiments of the present invention are provided herein, the present invention is not to be limited to these embodiments. The present invention contemplates numerous variations in the specific methodology used and the specific structures used. One skilled in the art having the benefit of this disclosure will understand that numerous variations and substitutions are within the spirit and scope of the invention.

What is claimed is:

1. A method for processing unseparated egg shells, comprising:
    placing unseparated egg shells in a separation tank containing fluid;
    applying cavitation to the unseparated egg shells in the fluid to thereby separate the egg shell membranes from the egg shells; and
    recovering the egg shell membranes.

2. The method of claim 1 further comprising recirculating the fluid.

3. The method of claim 2 wherein the recirculating the fluid comprises recirculating the fluid through a recirculating loop.

4. The method of claim 3 wherein the applying cavitation being performed using at least one submersible mixer positioned within the recirculating loop.

5. The method of claim 1 further comprising processing the egg shell membranes.

6. The method of claim 5 wherein the processing comprises recovering one or more constituent materials from the egg shell membranes.

7. The method of claim 1 further comprising recovering the egg shells.

8. The method of claim 7 further comprising processing the egg shells.

9. The method of claim 8 wherein the processing the egg shells comprises grinding the egg shells.

10. The method of claim 1 further comprising removing moisture from the egg shell membranes.

11. An apparatus for processing unseparated egg shells, the apparatus comprising:
    a separation tank for holding a fluid;
    a recirculating loop operatively connected to the separation tank;
    at least one submersible mixer in the recirculating loop to recirculate the fluid and egg shell membranes and egg shells within the fluid;
    a membrane collection conveyor for conveying egg shell membranes from the separation tank;
    a shell conveyor positioned beneath the separation tank for conveying egg shells away from the separation tank.

12. A method for processing unseparated egg shells, comprising:
    placing unseparated egg shells in a separation tank containing fluid;
    applying cavitation to the unseparated egg shells in the fluid to thereby separate the egg shell membranes from the egg shells; and
    recirculating the fluid through a recirculating loop creating turbulence in the fluid to assist in preventing the eggshells from settling before passing through the recirculating loop more than once; and
    recovering the egg shell membranes.

13. The method of claim 12 wherein the creating the turbulence is performed by directing the fluid downward toward mixing paddles.

14. The method of claim 13 wherein the directing the fluid downward toward the mixing paddles is performed using a deflector.

15. The method of claim 12 wherein the applying cavitation being performed using at least one submersible mixer positioned within the recirculating loop.

16. The method of claim 12 further comprising milling the unseparated egg shells prior to placing the unseparated egg shells in the separation tank.

17. The method of claim 12 further comprising processing the egg shell membranes.

18. The method of claim 17 wherein the processing comprises recovering one or more constituent materials from the egg shell membranes.

19. The method of claim 12 further comprising recovering the egg shells.

20. The method of claim 19 further comprising processing the egg shells.

21. The method of claim 20 wherein the processing the egg shells comprises grinding the egg shells.

22. The method of claim 12 further comprising removing moisture from the egg shell membranes.

23. The method of claim 12 further comprising spraying the egg shell membranes to reduce or eliminate pathogens.

24. An apparatus for processing unseparated egg shells, the apparatus comprising:
  a separation tank for holding a fluid;
  a recirculating loop operatively connected to the separation tank;
  at least one submersible mixer in the recirculating loop to recirculate the fluid and egg shell membranes and egg shells within the fluid;
  a membrane collection conveyor for conveying egg shell membranes from the separation tank;
  a shell conveyor positioned beneath the separation tank for conveying egg shells away from the separation tank; and
  a deflector shield positioned within the separation tank and proximate an outlet of the recirculating loop to direct the fluid downward thereby creating turbulence.

25. The apparatus of claim 24 further comprising a plurality of mixing paddles positioned along a bottom of the separation tank, and wherein the deflector shield deflects the fluid downward toward the plurality of mixing paddles.

26. The apparatus of claim 24 wherein the membrane collection conveyor comprises a mesh belt passing through the separation tank.

27. The apparatus of claim 24 wherein the shell conveyor is a drag conveyor.

28. The apparatus of claim 24 further comprising a plurality of collector rollers for collecting egg shell membranes from the collector.

29. The apparatus of claim 28 further comprising a belt press positioned for pressing the egg shell membranes after the plurality of collector rollers collect the egg shell membranes.

30. The apparatus of claim 28 further comprising, a sprayer positioned for spraying the egg shell membranes.

31. The apparatus of claim 24 further comprising a control system operatively connected to a plurality of sensors and a plurality of controls associated with the apparatus, the control system adapted for controlling the processing of the unseparated egg shells.

* * * * *